April 3, 1951     G. H. LOVELL     2,547,133

WAVE FILTER

Filed Dec. 4, 1947

INVENTOR
G. H. LOVELL
BY
*Ralph T. Holcomb*
ATTORNEY

Patented Apr. 3, 1951

2,547,133

UNITED STATES PATENT OFFICE 2,547,133

WAVE FILTER

George H. Lovell, New York, N. Y., assignor to Bell Telephone Laboratories, Incorporated, New York, N. Y., a corporation of New York Application December 4, 1947, Serial No. 789,666

4 Claims. (Cl. 178—44)

This invention relates to wave transmission networks and more particularly to a temperature-compensated wave filter.

The principal object of the invention is to improve the stability of the transmission characteristic of a wave filter in which the operating temperature is subject to change. More specifically, the object is to minimize or substantially eliminate, at a selected frequency or over a narrow band of frequencies within the transmission band, changes in the insertion loss of the filter due to changes in the operating temperature.

In general, a change in the operating temperature of a reactor will cause a change both in the value of the reactance and in the internal dissipation or Q factor, which is the ratio of reactance to effective resistance. In a wave filter made up of reactors of this type, an increase in the operating temperature will cause a decrease in the Q's of the component elements and, consequently, an increase in the insertion loss throughout the transmission band. A decrease in the temperature, on the other hand, will cause a lowering of the loss in the band. The accompanying changes in the reactances of the elements will, in general, cause a sidewise shift of the band which may result in a further change in loss at some selected frequency. This change in loss with temperature is undesirable in many filter applications such, for example, as narrow band filters used to pass carrier or pilot frequencies.

In accordance with the present invention such a filter is made self-compensating over a range of temperatures by so designing the filter that, at the selected frequency, the change in loss caused by the change in Q is balanced by the change in loss due to the shift of the band. This is accomplished by providing over a portion, at least, of the transmission band a loss characteristic having a slope such that the change in the loss of the filter due to a change in its temperature is substantially compensated, at the selected frequency, by the frequency shift of the band due to the temperature change. The required slope may, for example, be provided by making the value of one or more of the filter reactances, or a terminating impedance, different from that determined on an image parameter basis, thus deliberately distorting the loss characteristic within the band. The filter components may include ordinary inductors and capacitors, piezoelectric crystals, or other suitable types of reactance elements and the circuit may be of ladder, lattice or other configuration.

The nature of the invention will be more fully understood from the following detailed description and by reference to the accompanying drawing, in which.

Figure 1:
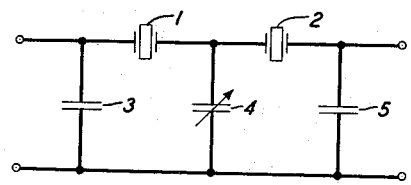
Fig. 1 is a schematic circuit of a wave filter to which the invention may be applied.

In the embodiment shown schematically in Fig. 1 the filter is a two-section, ladder-type, band-pass structure with mid-shunt termination at each end. The two series impedances are the piezoelectric crystals 1 and 2 and the shunt elements are the capacitors 3, 4 and 5. The crystals 1 and 2 are composed of ethylene diamine tartrate. Other material such, for example, as quartz, may be used for these crystals. When the filter is designed on an image parameter basis, the crystals 1 and 2 will normally be identical and the central capacitor 4 will have a capacitance twice as large as that of each of the end capacitors 3 and 5.

Figure 2:
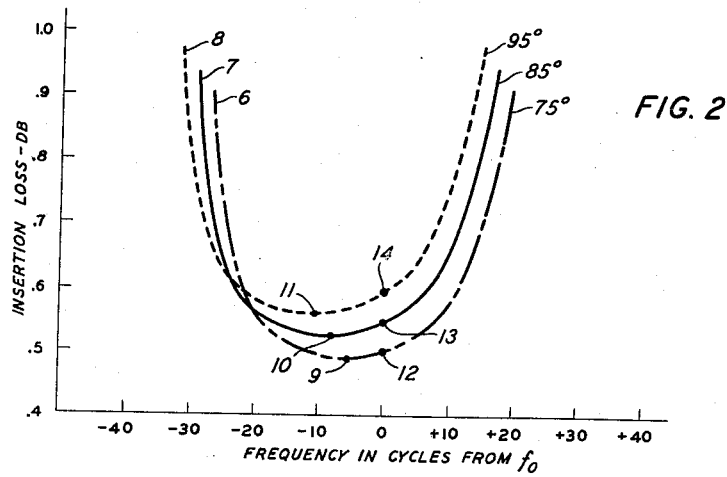
Fig. 2 is a family of curves showing the insertion loss within the transmission band at three different operating temperatures for an uncompensated filter.

Fig. 2 presents a family of typical curves showing the insertion loss-frequency characteristic within the transmission band at three different operating temperatures, assuming that the filter is designed on an image parameter basis and is terminated at each end in an impedance equal to its image impedance at the mid-band frequency. The dot-and-dash curve 6 is for a temperature of 75° F., the solid-line curve 7 for 85° and the dashed-line curve 8 for 95°. It is apparent that one effect of increasing the temperature is to shift the band to a lower frequency. The minimum points 9, 10 and 11 on the curves 6, 7 and 8 occur at progressively lower frequencies. This frequency shift is due to a change in the reactance of one or more of the filter elements 1 to 5.

An accompanying effect of increasing the temperature is to raise the level of the insertion loss throughout the band, due to a decrease in the Q of one or more of the elements 1 to 5. It is noted, for example, that the points 9, 10 and 11 are located at progressively higher losses. Consideration of the three points 12, 13 and 14 shows that at the reference frequency $f_0$, located above the mid-band, these effects are additive, and cause a considerable increase in loss as the temperature is raised.

In accordance with the invention these two effects are balanced one against the other so that the filter is made self-compensating over a temperature range. This is done by providing at the frequency $f_0$ a loss characteristic having a slope such that the change in loss due to the change in Q is just offset by the change in loss due to the shift in the band. If an increase in the temperature causes the band to shift downward in frequency, the slope should be negative, if upward in frequency, the slope should be positive. Since the curves 6, 7 and 8 of Fig. 2 show a downward frequency shift, a negative slope at $f_0$ is required, instead of the positive slope of the normal characteristic.

The filter of Fig. 1 may be modified to provide a negative slope at the frequency $f_0$ by adjusting one or more of the component reactances to other than its image parameter value. For example, the central capacitor 4 may be adjusted for this purpose. To facilitate the adjustment the capacitor 4 may be made variable, as indicated by the arrow. Decreasing the value of this capacitance introduces at or near the center of the band a bump of insertion loss the height of which is proportional to the change in capacitance. The slope along the sides increases with the height of the bump. Therefore, the capacitor 4 is adjusted until the required slope is attained. This slope may be computed but in most cases is more conveniently found by trial.

Figure 3:
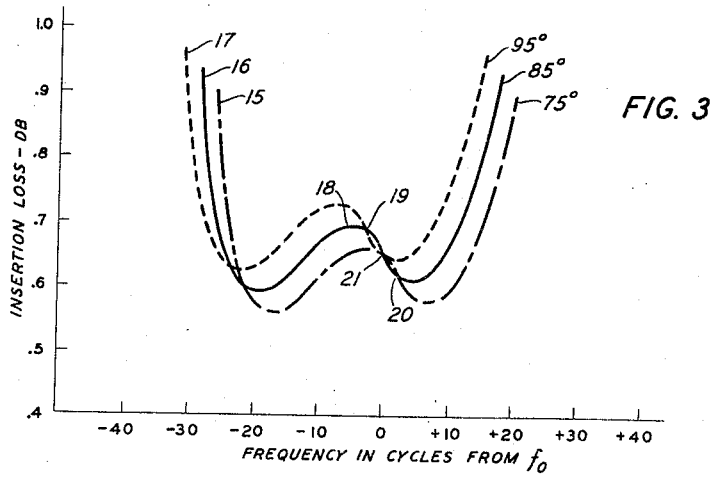
Fig. 3 is a similar family of curves for a temperature-compensated filter designed in accordance with the invention.

Fig. 3 shows a family of three insertion loss characteristics for the filter of Fig. 1 when the capacitance of the capacitor 4 is approximately 10 per cent lower than its image parameter value. Curve 15 is for an operating temperature of 75° F., curve 16 for 85° and curve 17 for 95°. The intermediate curve 16, it will be noted, has a bump of loss 18 which is substantially centrally located within the transmission band. The slope of curve 16 has the proper negative value at the reference frequency $f_0$ and is substantially constant between the points 19 and 20. As is seen from curve 17, when the temperature is increased to 95° the band is shifted down in frequency but the loss throughout the band is raised sufficiently so that the loss at the point 21 corresponding to $f_0$, and over a narrow band of frequencies on either side thereof, remains substantially constant. Curve 15 shows that when the temperature is decreased to 75° the band shifts upward in frequency but at the same time the level is lowered and the loss at $f_0$ is again substantially unchanged. Furthermore, it is found that the loss at $f_0$ changes only slightly throughout the entire temperature range from 75° to 95°.

It will be understood that the invention is applicable to filters of other than the ladder type. For example, United States Patent 2,216,937, to D. F. Ciccolella, issued October 8, 1940, discloses a lattice-type filter in which a controllable bump of loss may be introduced into the transmission band by a proper choice of the critical frequencies of the component crystal elements.

Another method of obtaining a controllable bump of loss in the band is to terminate the filter at one or both ends in an impedance which differs in value from the image impedance at the mid-band frequency. This method is disclosed, for example, in United States Patent 1,636,152, to T. E. Shea, issued July 19, 1927.

What is claimed is:

1. A temperature-compensated, band-pass wave filter of the ladder type comprising two substantially identical series-connected piezoelectric crystals, a central shunt capacitor, and two substantially equal shunt end capacitors, said crystals and capacitors being of such types that an increase in the operating temperature tends to increase the insertion loss of the filter in the transmission band and shift the band to a lower frequency, and the capacitance of said central capacitor differing from twice the capacitance of each of said end capacitors by an amount such that at a selected frequency within the band above the mid-band frequency the change in loss due to a change in the temperature is substantially compensated by the change in loss due to the frequency shift of the band.

2. A filter in accordance with claim 1 in which the capacitance of said central capacitor is less than twice the capacitance of each of said end capacitors.

3. A filter in accordance with claim 1 in which the capacitance of said central capacitor is approximately 10 per cent less than twice the capacitance of each of said end capacitors.

4. A filter in accordance with claim 1 in which said central capacitor is variable.

GEORGE H. LOVELL.

REFERENCES CITED

The following references are of record in the file of this patent:

UNITED STATES PATENTS

| Number | Name | Date |
|---|---|---|
| 1,636,152 | Shea | July 19, 1927 |
| 2,045,991 | Mason | June 30, 1936 |
| 2,165,509 | Ring et al. | July 11, 1939 |